(12) United States Patent
Lain et al.

(10) Patent No.: US 9,178,850 B2
(45) Date of Patent: Nov. 3, 2015

(54) DISTRIBUTED NETWORK CONNECTION POLICY MANAGEMENT

(75) Inventors: Antonio Lain, Bristol (GB); Patrick Goldsack, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1575 days.

(21) Appl. No.: 12/400,526

(22) Filed: Mar. 9, 2009

(65) Prior Publication Data

US 2010/0115101 A1     May 6, 2010

(30) Foreign Application Priority Data

Mar. 7, 2008   (GB) .................................. 0804263.2

(51) Int. Cl.

| | |
|---|---|
| G06F 15/16 | (2006.01) |
| G06F 15/173 | (2006.01) |
| H04L 12/28 | (2006.01) |
| H04J 1/02 | (2006.01) |
| H04L 29/06 | (2006.01) |
| H04L 12/751 | (2013.01) |
| H04L 12/755 | (2013.01) |
| H04L 12/725 | (2013.01) |
| H04L 12/24 | (2006.01) |

(52) U.S. Cl.
CPC ............ *H04L 63/0227* (2013.01); *H04L 45/02* (2013.01); *H04L 45/021* (2013.01); *H04L 45/308* (2013.01); *H04L 41/0893* (2013.01); *H04L 63/0218* (2013.01)

(58) Field of Classification Search
USPC ................ 709/223, 224, 227–229, 238–240; 370/395.2
See application file for complete search history.

(56) References Cited

U.S. PATENT DOCUMENTS

| | | | | |
|---|---|---|---|---|
| 7,639,607 B2 * | 12/2009 | Fujii et al. | ...................... | 370/228 |
| 7,657,659 B1 * | 2/2010 | Lambeth et al. | .............. | 709/250 |
| 2006/0153191 A1 * | 7/2006 | Rajsic et al. | ................... | 370/392 |
| 2008/0240102 A1 * | 10/2008 | Rajsic et al. | ................... | 370/392 |
| 2008/0244690 A1 * | 10/2008 | Kulkarni et al. | ................... | 726/1 |
| 2009/0016331 A1 * | 1/2009 | Shah et al. | ..................... | 370/356 |

FOREIGN PATENT DOCUMENTS

WO    WO 2005/022807 A2    3/2005

* cited by examiner

*Primary Examiner* — Ninos Donabed
*Assistant Examiner* — Farrukh Hussain
(74) *Attorney, Agent, or Firm* — Hewlett-Packard Patent Department

(57) ABSTRACT

A connection policy for a communications network has a local connection policy indicating which paths between a given one of the nodes (computer A, router A, host 898) and others of the nodes (computers B, C, filters B1, B2, C1, C2, hosts 890, 892) are allowable paths, by a symbolic expression of ranges endpoint addresses and other local connection policies in respect of other nodes. It is implemented in a distributed manner by determining, for the given node, which of the allowable paths, are dual authorized as allowable by the other local connection policy relating to the other node at the other end of that path, by Boolean operations on the symbolic expressions. For a given message for a given path between two of the nodes having their own local connection policies, both of these nodes determine whether the given path is currently dual authorized. This can provide reassurance that changes in versions of the connection policy won't transiently open a risk of undetected unwanted communication.

19 Claims, 12 Drawing Sheets

LOCAL CONNECTION POLICY INDICATING ALLOWABLE PATHS BETWEEN GIVEN NODE AND OTHER NODES

OTHER LOCAL CONNECTION POLICIES CORRESPONDING TO OTHER NODES

DETERMINATION OF DUAL AUTHORIZED PATHS INDICATED ALLOWABLE BY LOCAL POLICY AT BOTH ENDS OF PATHS 200

CAUSE NODES AT BOTH ENDS OF PATH TO DETERMINE WHETHER GIVEN PATH IS DUAL AUTHORISED 210

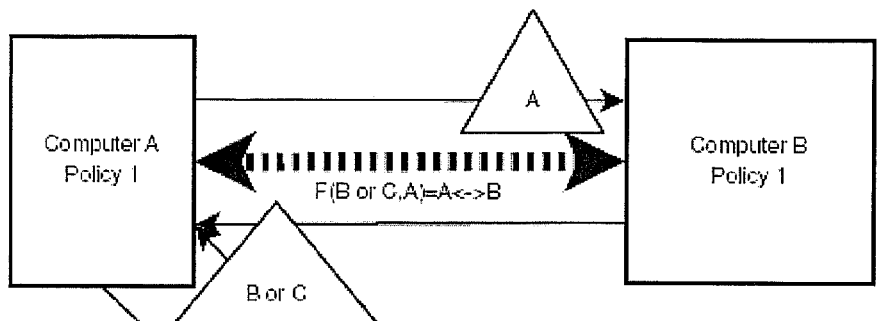
FIG 5
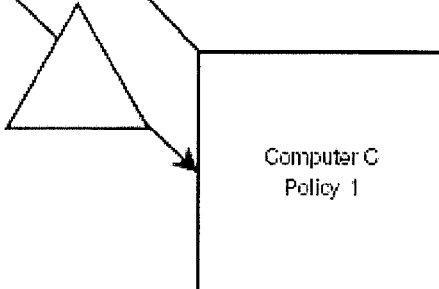
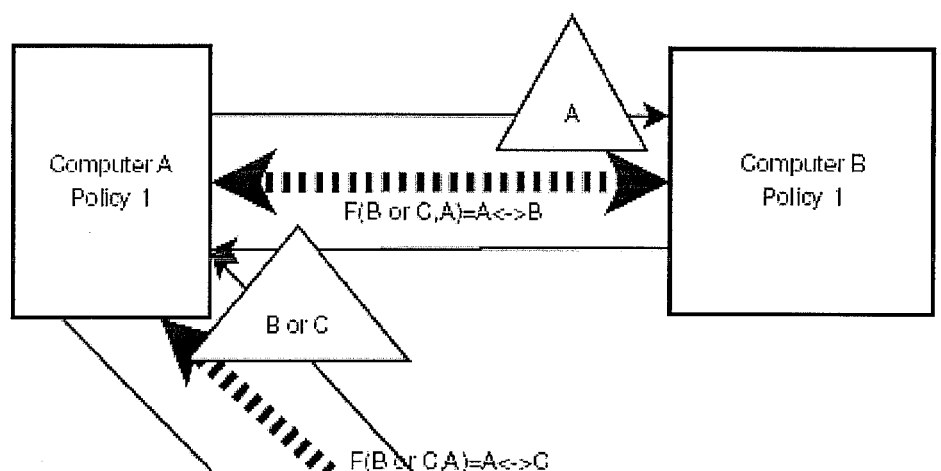
FIG 6
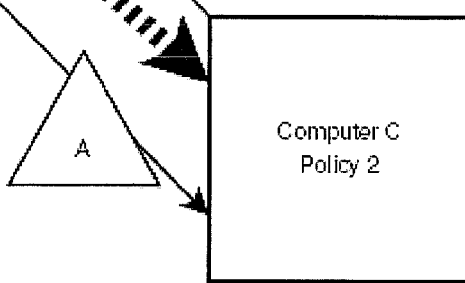

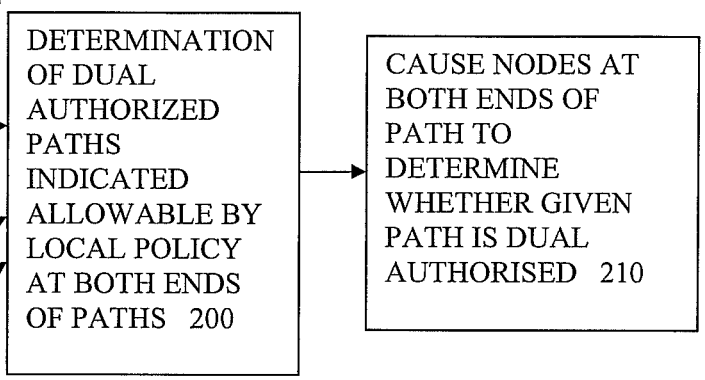
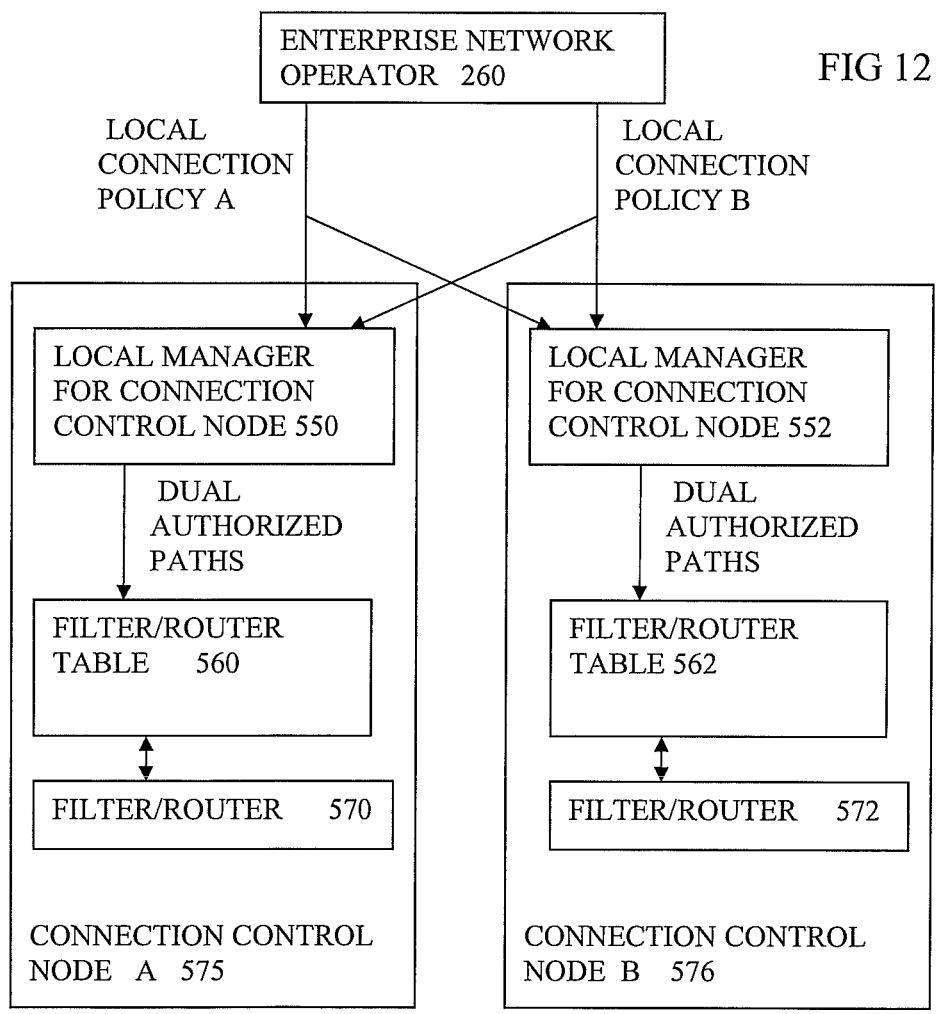

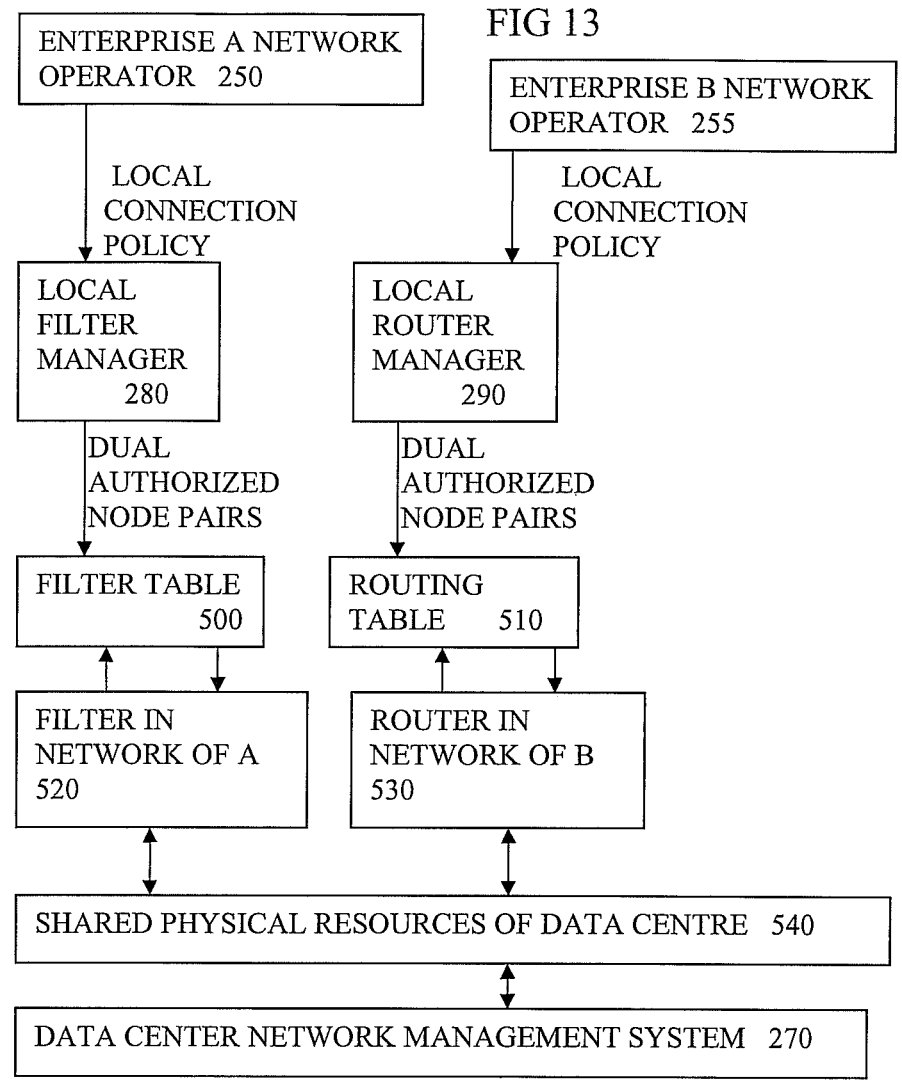

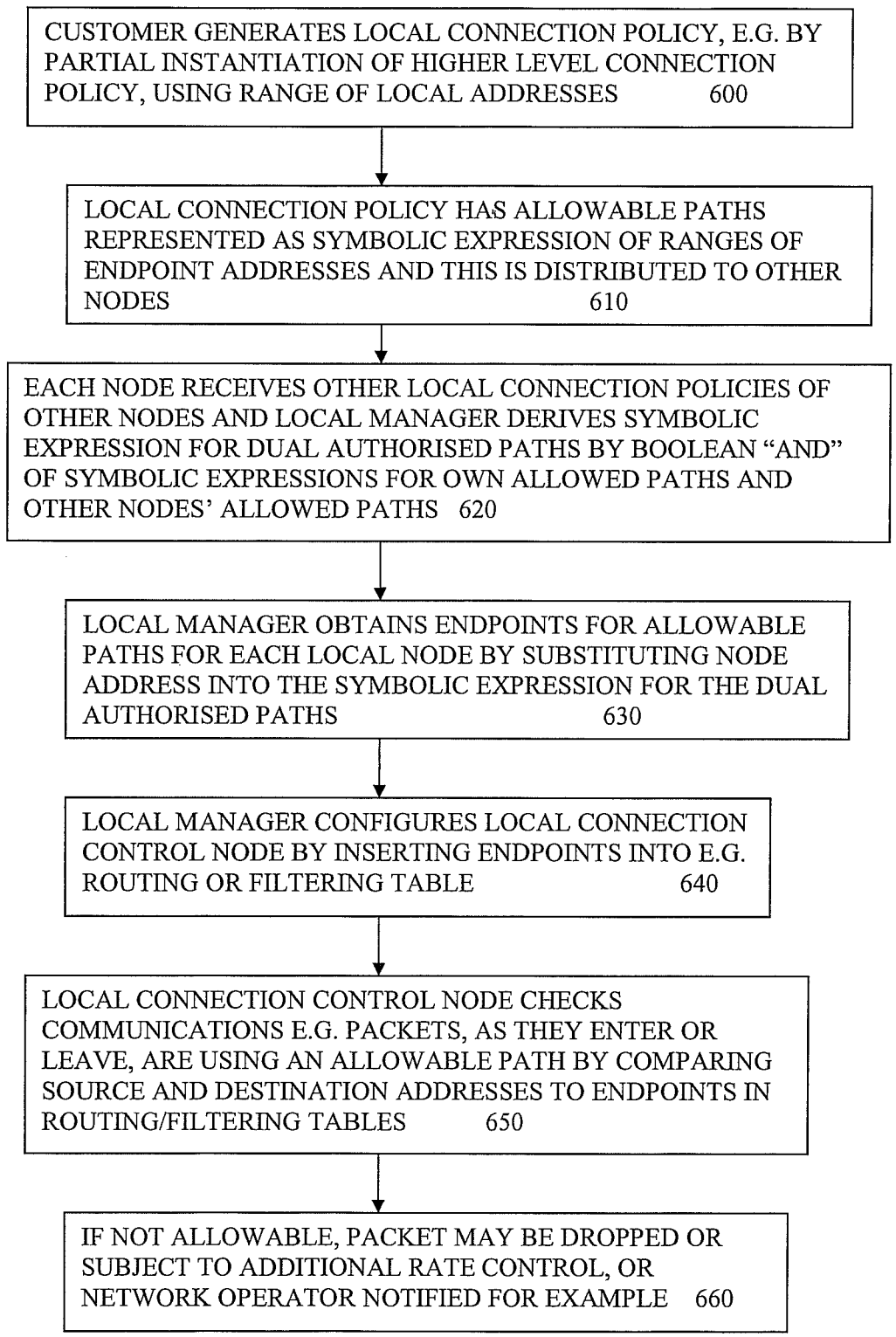

FIG 20

ENTERPRISE WISHES TO ALLOW ACCESS TO THEIR FARM 3 BY E.G. A SUPPLIER TO MONITOR INVENTORY ON SUBNET 2, HOST 7, THE SUPPLIER HAVING MACHINES ON FARM 8 SUBNET 5    760

OPERATOR FOR FARM 3 ALLOWS ANY VM IN FARM 8 TO ACCESS VM WITH NETWORK ADDRESS <FARM:SUBNET:HOST> IS<3:2:7> BY ADDING LOCAL CONNECTION POLICY REPRESENTED BY EXPRESSION:
connect(f1,s1,h1,f2,s2,h2) where (f1 == 3) and (s1 == 2) and (h1 ==7) and (f2 == 8)
770

OPERATOR FOR FARM 8 ALLOWS ANY VM IN SUBNET 5 (IN FARM 8) TO TALK TO ANY VM IN FARM 3 BY ADDING LOCAL CONNECTION POLICY REPRESENTED BY SYMBOLIC EXPRESSION:
connect(f1,s1,h1,f2,s2,h2) where (f1 == 8) and (s1 == 5) and (f2 == 3)
780

DATA CENTRE NETWORK MANAGEMENT SYSTEM DISTRIBUTES THESE NEW LOCAL CONNECTION POLICIES TO ALL OTHER LOCAL MANAGERS FOR CONNECTION CONTROL NODES    790

ALL LOCAL MANAGERS RECALCULATE THEIR DUAL AUTHORISED PATHS EXPRESSION, E.G. FOR VMs AT <3:2:7>
connect(f1,s1,h1,f2,s2,h2) and connect(f2,s2,h2,f1,s1,h1) becomes expression (1):
[(f1==8) and (s1 == 5) and (f2 == 3) and (s2 == 2) and (h2 ==7)] or [ (f1==3) and (s1 == 2) and (h1 == 7) and (f2 == 8) and (s2 == 5)]
793

EACH LOCAL MANAGER INSTANTIATES EXPRESSION (1) FOR ITS LOCAL NODES SO FOR VM <3:2:7> SUBSTITUTE f1 BY 3, s1 BY 2 AND h1 BY 7 IN EXPRESSION (1) TO OBTAIN:
[(f2 == 8) and (s2 == 5)] SO FILTER TABLE ALLOWABLE ADDR RANGE IS : <8:5:*> FOR INGRESS SOURCE OR FOR EGRESS DESTINATION.

FOR A VM IN FARM 8, E.G., <8:5:9>, SUBSTITUTE f1 BY 8, s1 BY 5 AND h1 BY 9 IN EXPRESSION (1) TO OBTAIN: [(f2 == 3) and (s2 == 2) and (h2 ==7)] SO FILTER TABLE ALLOWABLE ADDR RANGE IS : <3:2:7> FOR INGRESS SOURCE OR FOR EGRESS DESTINATION.
795

DISTRIBUTED NETWORK CONNECTION POLICY MANAGEMENT

RELATED APPLICATIONS

This application relates to commonly assigned and copending U.S. patent application Ser. No. 12/400,491 entitled "ROUTING ACROSS A VIRTUAL NETWORK", and U.S. patent application Ser. No. 12/400,510 entitled "VIRTUAL MACHINE LIVENESS CHECK", filed on even date herewith, and hereby incorporated by reference in their entirety.

CLAIM FOR PRIORITY

This application claims the benefit of priority under 35 U.S.C. §119 to United Kingdom Patent Application No. 0804263.2, filed on Mar. 7, 2008, the disclosure of which is hereby incorporated by reference in its entirety.

FIELD OF THE INVENTION

The invention relates to programs for communications networks, programs for parts of such networks such as connection control nodes, methods of managing or using such networks, and corresponding apparatus, networks, network nodes and data centers having such networks, nodes or programs, and methods of providing services or using services provided by such data centers.

BACKGROUND

In most physical IT infrastructure, resource utilization is very low: 15% is not an uncommon utilization for a server, 5% for a desktop. It is known to try to address this by sharing a physical machine between different users. Typically in a utility data center there may be hundreds of machines networked and shared by many enterprises. Each enterprise may be running many applications to serve their own customers. Known operating systems can be used to time share the physical processing resources of the machines between the different enterprises. Various ways are known to abstract or hide the underlying physical resources from the applications run by the enterprises.

Overlay networks are known and make it easy to change the network configuration, abstracting devices from the configuration of the real network.

Storage virtualisation is also known. There are many commercial storage virtualization products on the market from HP, IBM, EMC and others. These products are focused on managing the storage available to physical machines and increasing the utilization of storage.

Virtual machine technology is a known mechanism to run operating system instances on one physical machine independently of other operating system instances. It is known to have a single physical hosting machine running two or more virtual machines connected by a virtual network on this machine.

A virtual machine (VM) is a self-contained operating environment that emulates a hardware platform. It can run a "guest" operating system. A real operating system called a virtual machine manager (VMM) is run on the physical hardware platform. The VMM runs one or more VMs and can contain multiple virtual devices, one of which can be a virtual network interface card (VNIC). VMware is a known example of virtual machine technology, and can provide isolated environments for different operating system instances running on the same physical machine.

An example of a virtual network interface is described in "SoftUDC: A Software-Based Data Center for Utility Computing", Kallahalla et al, Computer, November 2004, p38-46. Virtual machines access networking via a virtual network interface (VIF), which mimics an Ethernet device. A virtual machine manager (VMM) forwards outbound network packets to its physical network interface and dispatches incoming network packets to appropriate VIFs. The VMM encapsulates the packet and sends it to another VMM or a virtual router on the same VNET. The receiving VMM unwraps the packet and delivers it to the target VM.

In "Towards Automated Provisioning of Secure Virtualized Networks", by Cabuk et al, November 2007, it is explained that a VMM can be hosted directly on the computer hardware (e.g., Xen) or within a host operating system (e.g., VMware). Today's virtual network implementations for VMMs are usually virtual switches or bridges that connect the virtual network cards of all VMs to the actual physical network card of the physical machine. All VMs can potentially see all traffic; hence, no isolation or other security guarantees can be given. While that level of security may be sufficient for individual and small enterprise purposes, it is certainly not sufficient for larger-scale, security-critical operations. This document proposes security-enhanced network virtualization, which (1) allows groups of related VMs running on separate physical machines to be connected together as though they were on their own separate network fabric, and (2) enforces cross-group security requirements such as isolation, confidentiality, integrity, and information flow control.

Related VMs (e.g., VMs belonging to the same customer in a data center) distributed across several physical machines, are grouped into virtual enclave networks, so that each group of VMs has the same protection as if the VMs were hosted on a separate physical LAN. If some VMs in a group are co-hosted on the same hardware; it is not necessary to involve the physical network during information flow between two such VMs.

A secure network virtualization framework helps realize the abstraction of Trusted Virtual Domains (TVDs) by guaranteeing reliable isolation and flow control between domain boundaries. The framework is based on existing and well-established network virtualization technologies such as Ethernet encapsulation, VLAN tagging, and virtual private networks (VPNs).

It is known to provide isolation between a secure "internal" network and insecure "external" machines or networks such as the internet, by providing filters in the form of firewalls. These typically allow packets through if their source and destination addresses (such as IP source and destination addresses) are within given ranges. The ranges can be set by a site or enterprise operator or administrator according to an external security policy.

It is known from "Distributed Firewalls" by Steven Bellovin, November 1999 issue of ;login: p37-39, to provide a distributed firewall in which policy is centrally defined, but enforcement takes place at each endpoint in a network rather than at a boundary or gateway to the network. This can reduce dependency on network topology, compared to conventional firewalls, but relies on three notions: a policy language indicating what sort of connections are permitted, a distribution mechanism for distributing a policy file to all endpoints such as host machines to be protected, and at each of the host machines accepting or rejecting packets according to the policy. The sender identity may be securely verified using for example IPSEC.

BRIEF DESCRIPTION OF THE FIGURES

Specific embodiments of the invention will now be described, by way of example, to show how they may be implemented, with reference to the accompanying figures, in which:

FIGS. 5 to 7 show three endpoints in a network according to conventional arrangements similar to FIG. 1 and showing successive states during unsynchronised update of connection policies, FIG. 11 shows some principal steps according to an embodiment of the invention, FIGS. 12 and 13 show schematic views of some parts of a network according to embodiments of the invention, FIG. 14 shows some principal steps according to an embodiment of the invention, FIG. 19 shows an arrangement of several virtual network farms and their underlying physical hosts and physical network for use in some embodiments and FIG. 20 shows an example of some principal steps in another embodiment for altering connection policies to allow a supplier access to parts of a network of an enterprise.

DESCRIPTION OF SPECIFIC EMBODIMENTS

Figure 1:
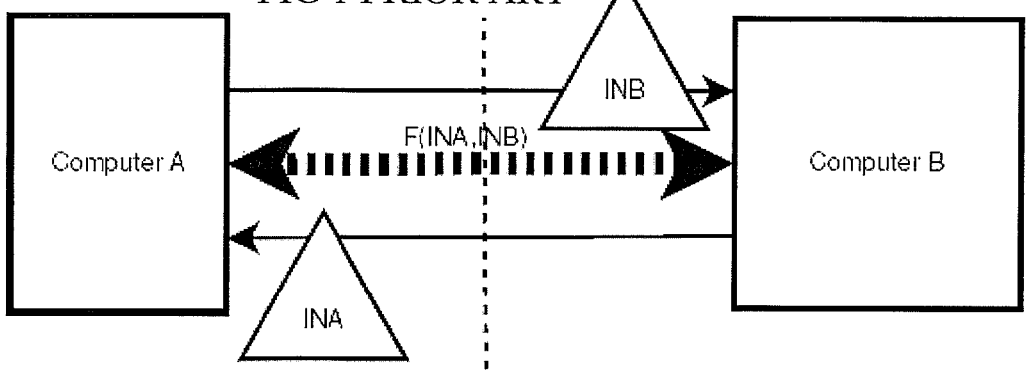
FIGS. 1 and 2 show two endpoints in a network according to conventional arrangements with either ingress or egress filtering at endpoints.

Embodiments described below show how the claimed invention can be implemented in various forms such as programs for communications networks, programs for parts of such networks such as connection control nodes, methods of managing or using such networks, and corresponding apparatus and systems for such programs or methods. Any additional features can be added to the features claimed, without departing from the scope of the claims. Some such additional features are set out in dependent claims, and some are shown in the embodiments of the invention described in more detail below. The methods of use aspects are useful to get direct infringement or inducing of direct infringement in cases where the system is largely located outside the jurisdiction, as is feasible with many such systems, yet the user is using the system and gaining the benefit, from within the jurisdiction. Some advantages are explained below, other advantages may be apparent to those skilled in the art, particularly over other prior art than that known to the inventors. Any of the additional features can be combined together, and combined with any of the aspects, as would be apparent to those skilled in the art. The embodiments are examples only, the scope is not limited by these examples, and many other examples can be conceived within the scope of the claims.

DEFINITIONS

"Local connection policy" is intended to encompass any way of representing configurations for one or more connection control nodes, either as the configuration data itself, or in a form such as expressions, rules or tables, from which the configuration data can be derived, for example, but not limited to a general form for many nodes, which is parameterised by node address, so that it can be instantiated by entering node addresses or node address ranges.

"Connection control node" is intended to encompass any type of network node having a connection function which is configurable, and so can encompass routers, switches, filters, rate control filters and so on.

"Path" is intended to encompass any direct or indirect route or part of a route between nodes for a message in a network, and may be indicated by source and destination addresses or in any other way.

"Message" can encompass any sort of packet, cell, frame and so on in any format, with or without a header, of fixed or variable length, with an associated destination address which may be incorporated in the packet, cell or frame, or stored elsewhere.

Data center is intended to encompass one or more computing machines grouped together at a single location whether for use by a single organisation or for sharing by many customers of a service provider organisation.

The term "virtual" usually means the opposite of real or physical, and is used where there is a level of indirection, or some mediation between a resource user and a physical resource.

"virtual entity" can encompass for example a virtual machine, a group of virtual machines, a virtual storage element, a virtual interface card, a virtual look up table, and so on, usually implemented as software to emulate a corresponding physical entity.

"Virtual machine" (VM) encompasses a system that emulates in software an entity such as a physical computer, or any processing entity, including entities for carrying out specific functions such as router firewall, gateway and so on, which can generate or make use of messages. Ideally, programs run by the virtual machine should have no way of determining whether they are running atop a virtual machine or a physical machine. Note, in current practice, sometimes programs are aware they're running in virtual machines so that they can optimize for it. A VM can have one or multiple virtual interfaces, for example in different segments of a segmented virtual network.

"Virtual machine manager" encompasses any entity which hosts virtual entities such as virtual machines and can be implemented in the form of software such as an operating system for execution by hardware such as a physical host machine having a general purpose processor, or can be a system comprising such software and hardware, or can be dedicated firmware or hardware or any combination or hybrid of these for example. It is conceivable for some of the functions of the virtual machine manager to be implemented by a privileged virtual entity, hosted by an underlying hypervisor or virtual machine monitor.

"virtual machine monitor" is a component used in some implementations of a virtual machine manager, for hosting of VMs and switching of packets to the appropriate VM, without higher level processing such as routing. It can be the lowest level component of the virtual machine manager, and is sometimes called a hypervisor.

"virtual network" means a network of virtual entities each having their own address so that messages can be passed between them. It may be segmented with virtual gateways to couple different segments. There may be multiple virtual networks in a data center.

"Physical host machine" can encompass any type of processing machine, an example is a server having processing, storage and networking functions. A host can have multiple physical network interfaces for example to provide redundancy or to provide more bandwidth.

"Intermediate destination address" can mean a link layer address such as a MAC (media access control) address or other type of address, and can be intermediate in the sense of denoting any point in the virtual or physical network or in communication stacks, passed by the message before reaching the final destination of the message.

"Final destination address" can mean a network layer address such as an IP address, or other address which is either the final destination of the message, or where the message leaves the physical network or virtual network for another network having another addressing scheme.

"farm" means the set of virtual entities owned, operated or controlled by a customer. Each farm can be a virtual network, or there can be multiple farms in a virtual network. Each farm may have one or more subnets.

Introduction to the Described Embodiments

In some of the embodiments described, there is shown a computer program for implementing a connection policy in a distributed manner in a communications network having a plurality of connection control nodes having filtering, switching or routing functions, the connection policy comprising a local connection policy indicating which paths between a given one of the nodes and others of the nodes are allowable paths, and other local connection policies in respect of at least some of the other nodes, indicating their allowable paths. The computer program determines, for the given node, which of the allowable paths indicated as allowable by the local connection policy, are dual authorised in the sense of also being indicated as allowable by the other local connection policy relating to the other node at the other end of that path. For a given message for a given path between two of the nodes having their own local connection policies, both of these nodes determine whether the given path is currently dual authorised.

The combination of using dual authorisation and of checking for it at both ends of the path can provide reassurance that any changes in versions of the connection policy won't open a risk of undetected unwanted communication. This in turn enables improved security and can provide more reassurance of a clean cut over to updated versions of services without needing to interrupt availability. By determining which nodes are dual authorised, allowability is considered from both ends of a path, rather than merely considering allowability from only one side. This means that each node can maintain and enforce its own view of what it believes the other endpoint of the path should currently allow. This gives distributed control in the sense that each node has a right of "veto" for communication to it or to local addresses which it controls if it is a filter or gateway. If the other endpoint has an out of date policy, that other endpoint might be relying on the given node not allowing communication under an old policy. If the new policy relies instead on the other endpoint not allowing communication, then unwanted communication might occur if allowability is not checked at both ends, or if conformance is only checked to a standard of one ended single authorisation. Hence this eventuality can be prevented by using dual authorisation and by checking at both endpoints. This enables different policies for nodes owned or controlled by different departments or organisations. This also enables the policy to use ranges and still specify any combination of exact paths in a more compact form than an explicit list of every individual allowed path between nodes. The checking taking place at both of the nodes ensures that if one side is updated with a new connection policy and the other side is not, the communication will only be allowed if the updated and the old policy both allow it. the old and the new policies are both enforced and so effectively a logical "AND" of the old and new connection policies is enforced. Hence the risk of non allowed communications getting through during times when the network is in the process of being updated can be reduced or avoided. Hence the difficulties or costs in trying to synchronise the updates can be reduced or avoided. The larger the network, the harder it is to maintain synchronisation, so by avoiding the synchronisation difficulty, scalability of the network can be improved.

Other embodiments include methods of implementing a connection policy, using a communications network having nodes etc, a data center having such a network, or a method of using a service offered from a data center.

FIGS. 1 to 4

Comparative Examples

Figure 2:
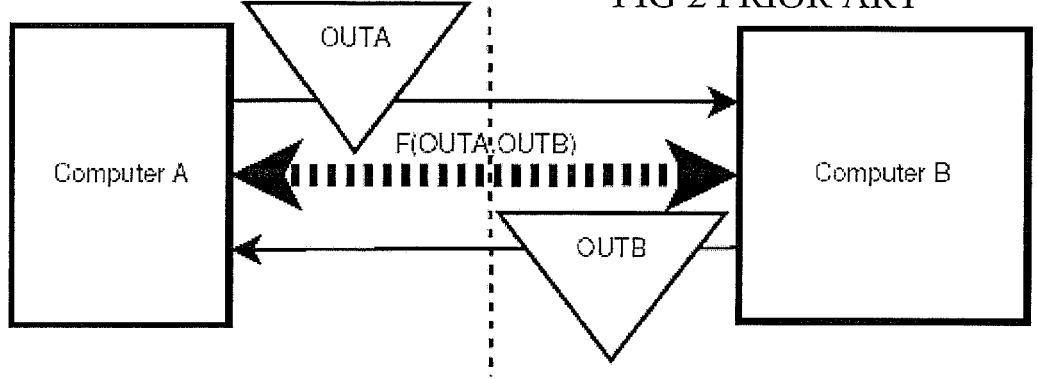
Figure 3:
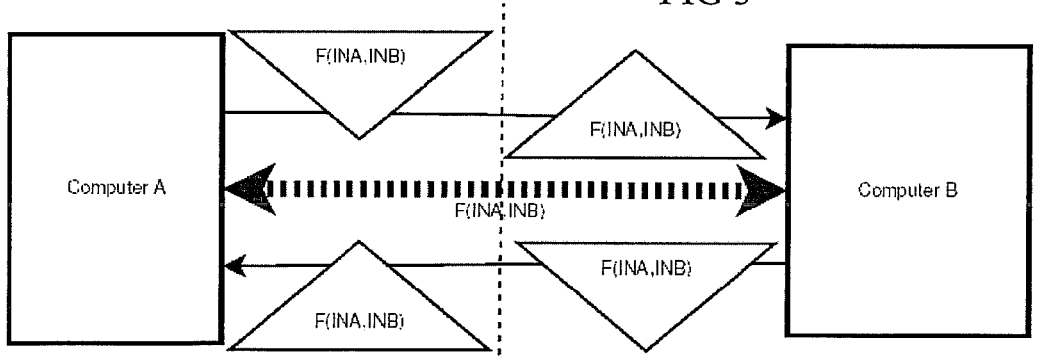
FIGS. 3 and 4 show two endpoints in a network with dual authorisation and both egress and ingress filtering according to embodiments of the invention.
Figure 4:
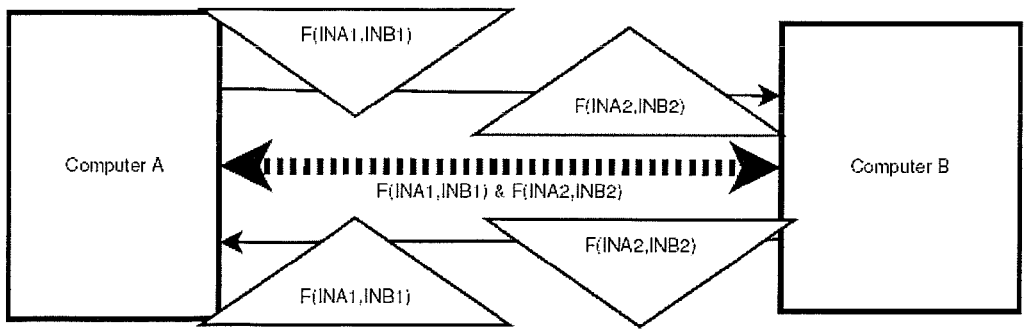

FIGS. 1 and 2 show two endpoints in a network according to conventional arrangements with either ingress or egress filtering at endpoints, while FIGS. 3 and 4 show two endpoints in a network with dual authorisation and both egress and ingress filtering according to embodiments of the invention. FIG. 1 shows network ingress packet filtering and its effect on bi-directional communication. Computer A has an in-bound policy INA that is enforced for all the incoming network traffic to A (ingress filtering). Computer B has an in-bound policy INB that is enforced for all the incoming network traffic to B. The resulting bi-directional traffic allowed between A and B is a deterministic function of both INA and INB that we call F(INA, INB).

FIG. 2 shows an equivalent configuration that filters outbound packets instead (egress filtering). Note that by making OUTA=INA and OUTB=INB we can obtain an equivalent bi-directional filtering, i.e., F(OUTA, OUTB)=F(INA, INB). FIG. 3 shows a schematic view of one possible embodiment of the present invention. Starting with policies INA and INB a computation is made of the bi-directional traffic that they will restrict if they were either both ingress (or egress) policies, i.e., F(INA, INB). This is an indication of dual authorised paths. Then, this level of filtering is applied to both ingress and egress.

Looking at FIG. 3 it may seem pointless to do the same filtering twice in each path from A to B (and from B to A). However, this has some useful effects, for example when there is an update of global policy and the policy in computer A is out of sync with the policy in computer B (as shown in FIG. 4). In that case only bi-directional communication allowed by both policies in any path from A to B is allowed. Therefore, if it can be proved that each version of the global

FIGS. 5 to 10

Comparative Examples with Three Endpoints

Figure 7:
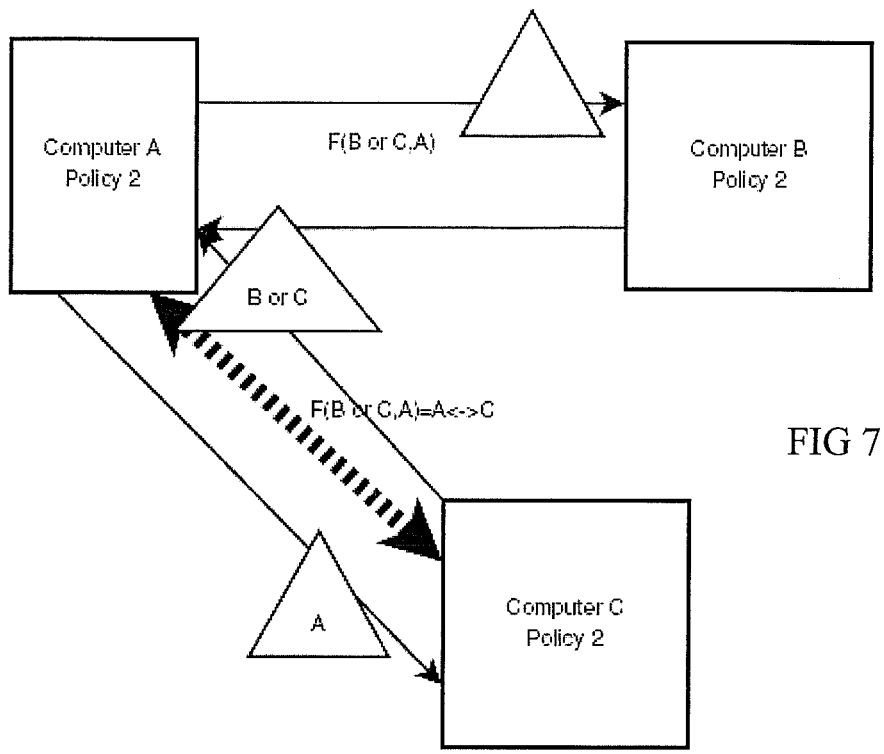
Figure 8:
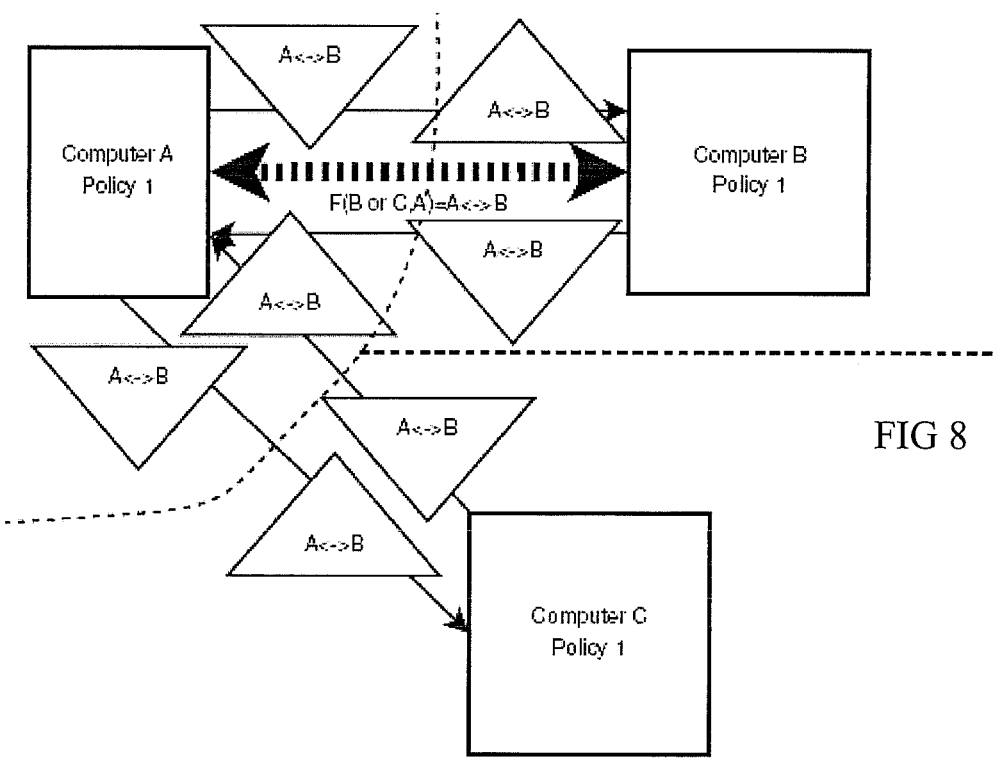
FIGS. 8 to 10 show three endpoints in a network according to embodiments of the invention similar to FIGS. 3 and 4 and showing successive states during unsynchronised update of connection policies.
Figure 9:
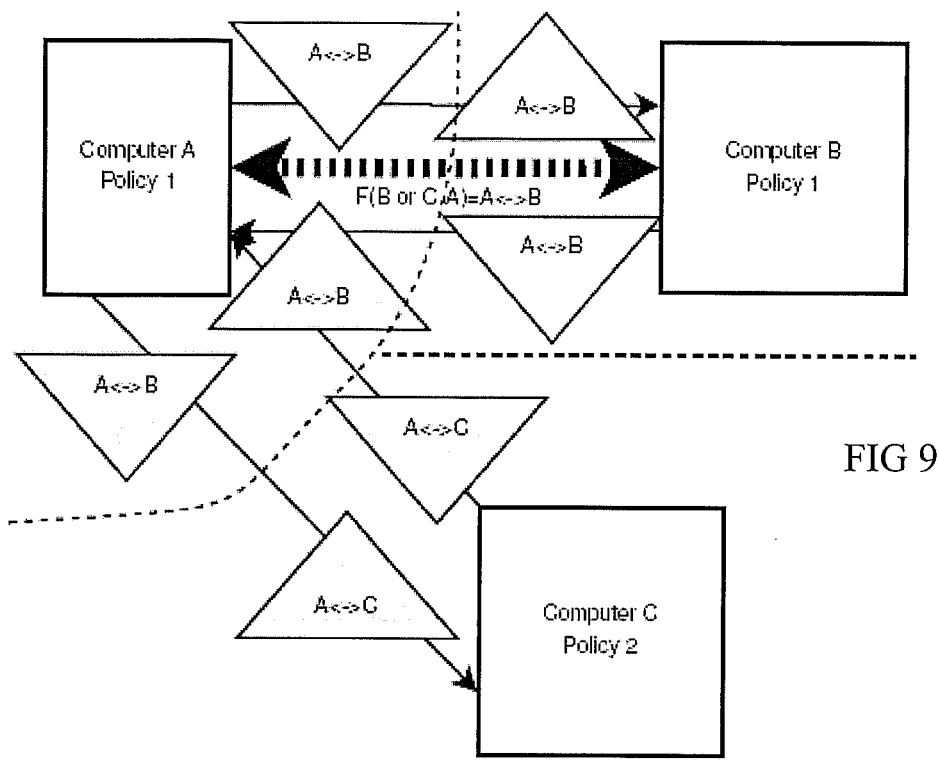
Figure 10:
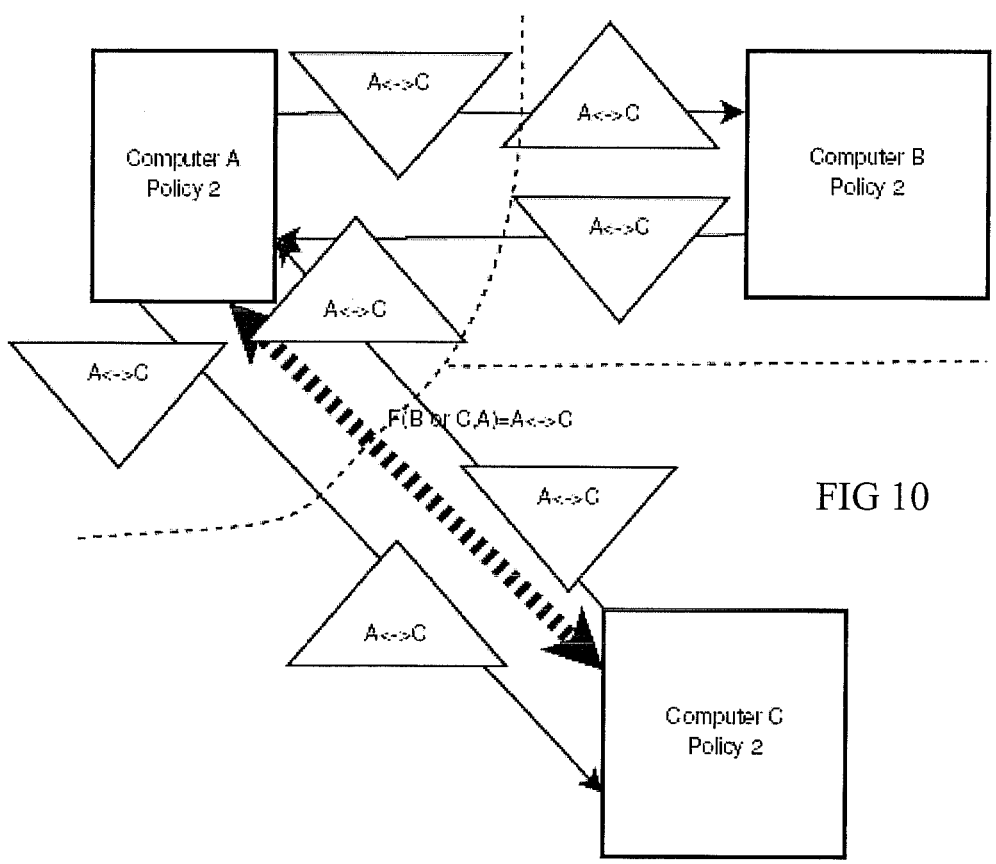

FIGS. 5 to 7 show three endpoints in a network according to conventional arrangements similar to FIG. 1 and showing successive states during unsynchronised update of connection policies, and FIGS. 8 to 10 show three endpoints in a network according to embodiments of the invention similar to FIGS. 3 and 4 and showing successive states during unsynchronised update of connection policies.

In this example there is a simple safety invariant that needs to be preserved across policy changes without required complete synchronisation of such changes. At any time it is desired to ensure that A can talk to B or C but not both at the same time. This is a typical requirement in network security sometimes called "disable split-tunnelling". In an initial configuration A should be talking to B but not to C. In the final configuration A should talk to C but not to B. This is implemented by the equivalent ingress filtering: in the first step, A allowing incoming traffic from B and C, B allowing traffic from A, and C allowing no traffic. In the second step, A keeps the same policy (i.e., allows incoming traffic from B and C), but now B allows no traffic and C allows A, i.e., just interchange the roles of B and C.

FIGS. 5 to 7 show what can go wrong when only ingress filtering (or only egress filtering) is used and when the filtering is not dual-authorised. Computer C updates policy before computer B and Computer A and there is a glitch in which A can talk to both B and C, violating the safety invariant.

FIGS. 8 to 10 shows that by using the combination of dual authorisation and checking at both ends, it is possible to avoid that type of unsafe transients. The approach shown in FIG. 3 is used, involving computing the exact bi-directional paths of a policy and enforce it for both ingress and egress filtering. In that case even though computer C updates policy before Computer B and Computer A, the old policy is still implicitly applied by A for both ingress and egress, and the intersection of the old policy and the new one blocks communication from A to C during the transient. Finally, both computer A and B update their policy and communication switches atomically from A→B to A→C (i.e., it is assumed that both ingress and egress local policies of A are changed atomically).

Any additional features can be added, some are set out in dependent claims and described in more detail below. For example the connection policy can have rules having a monotonic effect in the sense that each additional rule can only increase the number of allowable paths, and paths can only be removed by removing rules. This can make the computation of dual authorised paths easier and so make it easier to add rules and easier to handle large numbers of rules.

Another additional feature is determining the dual authorised paths locally to the given node. This could in principle be carried out centrally, but there is benefit in doing this in a distributed manner locally at or near each node as for large networks at least, the amount of information generated will tend to be much larger than the amount used to express the connection policy. Hence bandwidth used and delays caused in propagating changes can be reduced.

An allowable path can mean bidirectional communication is allowed. In principle the allowable paths could be allowed to communicate in only one direction, which might suit a node such as a display or a sensor, or separate dual authorised paths for each direction can be determined separately but treating bidirectional communication as a single allowable path is typically more efficient.

FIGS. 11 to 13

Embodiments

FIG. 11 shows some of the principal steps of an embodiment. A local connection policy indicating allowable paths between given node and other nodes is provided or generated for use in determining dual authorised paths. Other local connection policies corresponding to other nodes are also provided for use in the step 200 of determining dual authorized paths indicated allowable by local connection policy at both ends of paths. Then at step 210 the nodes at both ends of path determine whether the given path is dual authorised by their own versions of which paths are dual authorised.

FIG. 12 shows a view of parts of a network in the case of an example with a single enterprise having a network large enough to want to provide different parts with their own local connection policies. FIG. 13 shows a similar example for the case where there are multiple enterprises sharing infrastructure resources, each enterprise having control of their own local connection policies.

The network can comprise a customer network implemented on shared infrastructure shared with other customers. In principle the considerations set out above apply to non shared networks, but the connection control is particularly useful where there are multiple customers sharing resources to improve efficiency, such as in public communications networks and in data centers for example. The connection policy can be generated by the customer. This is particularly useful to enable customers to control their own connection policies to reduce an amount of network management by a third party such as a data center manager. Other examples can be envisaged where the data center manager controls the connection policies, or some of the policies, for example to enforce isolation between enterprise networks.

In FIG. 12, enterprise network operator 260 provides local connection policy A and local connection policy B and distributes them both to each connection control node. Connection control node A 575 has a manager 550 which can carry out an intersection of the local policies to determine dual authorised paths. This can mean an intersection of new policies with ones pre existing for that node. An indication of these dual authorised paths is fed to filter router table 560 for use by filter/router 570. This can be implemented in software or hardware and arranged to check packets on ingress or egress to check they meet the policy and have come in from or are heading out on a dual authorised path. Similarly, connection control node B 576 has a local manager 552 can carry out an intersection of the local connection policies to determine dual authorised paths. An indication of these paths is fed to filter router table 562 for use by filter/router 572. This can be implemented in software or hardware and arranged to check packets on ingress or egress to check they meet the policy and have come in from or are heading out on a dual authorised path.

There can be any number of local policies, any number of nodes, and the network can have any topology, including local area, or wide area networks. The policy can be expressed in a number of ways, and there can be a number of filters or routers managed by one local manager.

The connection control nodes can comprise any one or more of: a filter with stored rules, a switch with a switching table, and a router with a routing table, and the program being arranged to update respectively the store of filter rules, or the switching table or the routing table, according to the determined dual authorised other nodes. These are typical arrangements of nodes for enforcing connection policies, others can be envisaged.

The network can comprise an IP network and the connection policy can be represented in the form of which selections of IP addresses are allowed to communicate with other selections of IP addresses. This is a common and commercially valuable type of network layer, other types can be envisaged, and the connection policy can be represented using lower layer addresses, such as link layer or physical layer addresses.

FIG. 14

Example Using Symbolic Expressions

Another such additional feature is the local connection policy representing allowable paths by symbolic expressions of ranges of endpoint addresses. This can make it easier to determine dual authorised paths by logical operations on such expressions.

Any given node can carry out a boolean AND of the symbolic expressions for the local connection policy and for the other local connection policies to obtain an expression for the dual authorised paths as a function of node addresses. This is one way to make the determination more efficiently, and so make it easier to handle frequent changes or make the process more scalable to larger networks The given node can be configured to check for dual authorised paths using a store of endpoint node addresses, determined by substituting node addresses local to the given node into the expression for the dual authorised paths.

The connection policy can comprise a symbolic expression of ranges of endpoint addresses, and the program can be arranged to derive the local connection policy by partial evaluation of the symbolic expression using information associated with the given node.

As shown in FIG. 14, a customer generates a local connection policy, e.g. by partial instantiation of higher level connection policy, using a range of local addresses at step 600. The local connection policy has allowable paths represented as a symbolic expression of ranges of endpoint addresses and this is distributed to other nodes at step 610. Each node receives other local connection policies of other nodes and the local manager derives a symbolic expression for dual authorised paths by a boolean "AND" operation on the symbolic expressions for own allowed paths and other nodes' allowed paths at step 620.

The local manager obtains endpoints for allowable paths for each local node by substituting node addresses into the symbolic expression for the dual authorised paths at step 630. The local manager configures local connection control node by inserting endpoints into e.g. routing or filtering table at step 640.

The local connection control node checks communications e.g. packets, as they enter or leave, are using an allowable path by comparing source and destination addresses to endpoints in routing/filtering tables at step 650. If not allowable, a packet may be dropped or subject to additional rate control, or a network operator notified for example, at step 660.

FIGS. 15, 16

Service Cut Over Example

In some embodiments, the network can be used for hosting multiple services, the program being arranged to cut over the multiple services to another version of the services at different addresses in the network by changing the connection policy so that a user of the services cannot be connected to old versions once connected to any of the new services. This can enable changes to be made in an atomic way to avoid inconsistency between different versions of the services, even if they are not updated simultaneously, without closing the services down.

Figure 15:
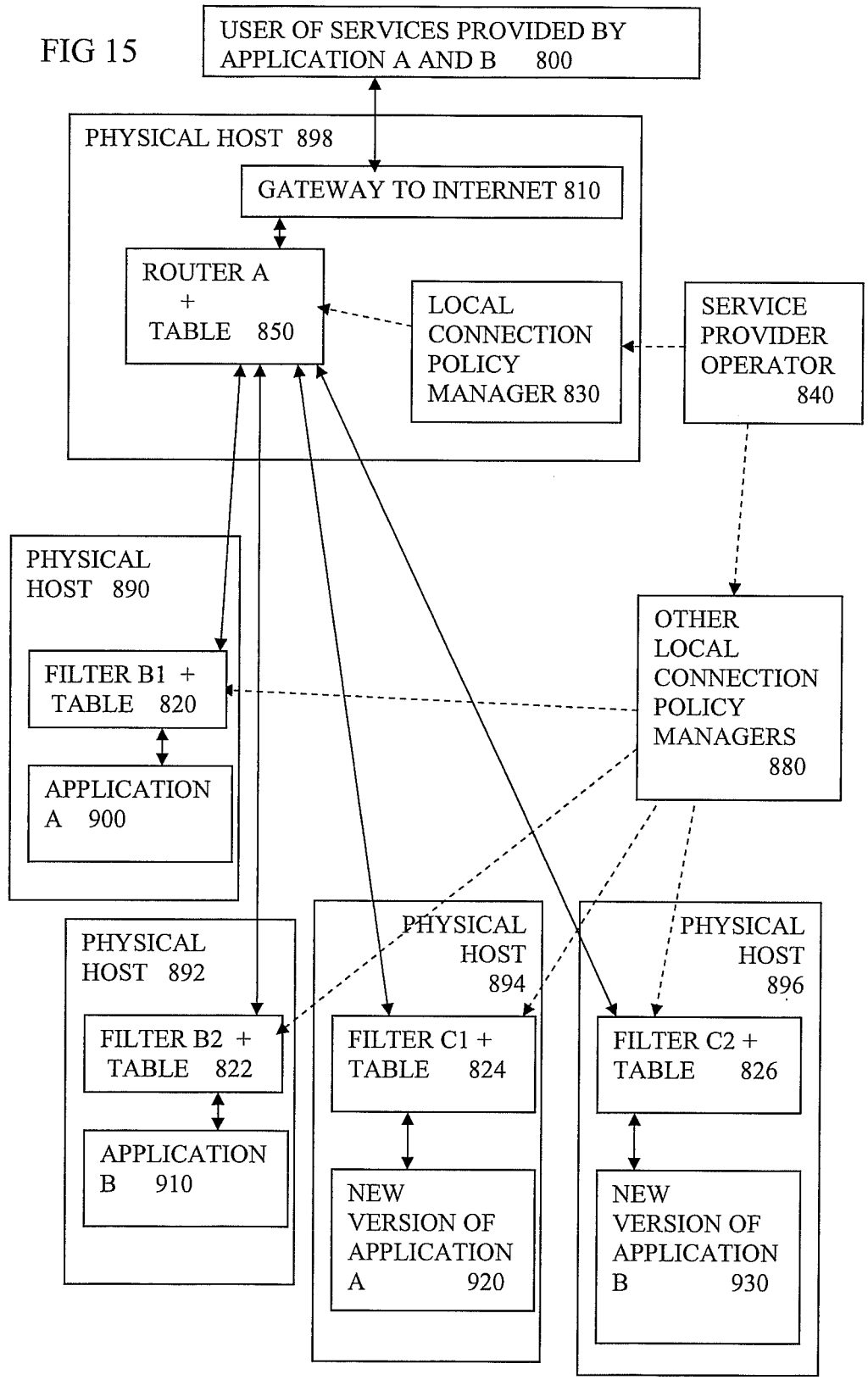
FIG. 15 shows a schematic view of some parts of a network according to another embodiment of the invention, for providing a service to a user.
Figure 16:
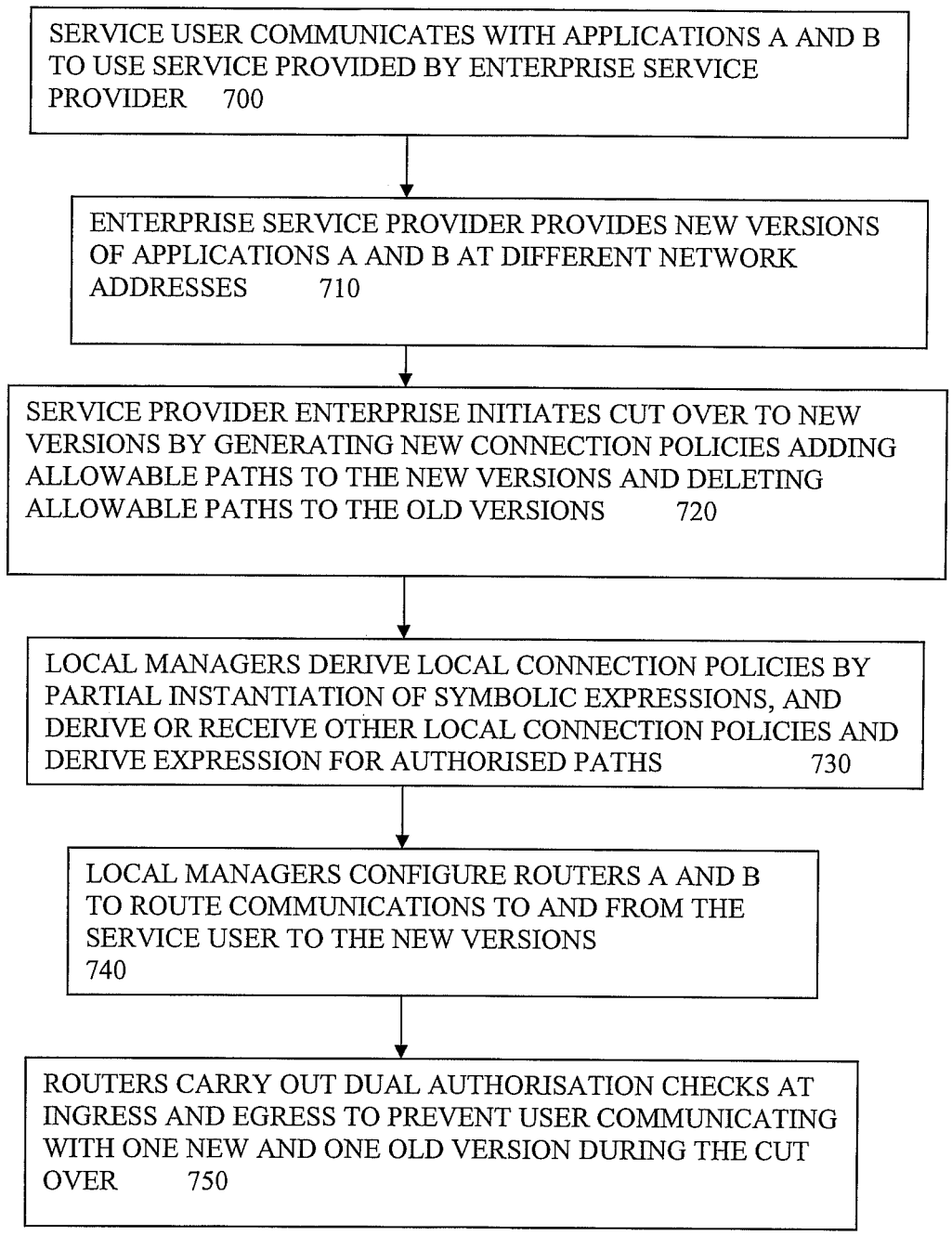
FIG. 16 shows some principal steps according to the embodiment of FIG. 14.

In the example shown in FIG. 15, a schematic view of some parts of a network according to another embodiment is shown, for providing a service to a user, and FIG. 16 shows some principal steps according to the embodiment of FIG. 15. A service user 800 is using applications A 900 and B 910 hosted on physical host machines 890 and 892 respectively. Packets to and from the user are routed via connection control nodes in the form of filters B1 820 and B2 822 and router A 850 with its own routing table. Router A is analogous to computer A in FIGS. 5 to 10, and filters B1 and B2 are analogous to computer B. The user is coupled by a gateway 810 to the internet. The gateway and router A are shown hosted by physical host 898.

A service provider operator 840 can provide a new version 920 of application A on physical host 894, and a new version 930 of application B on physical host 896. These new versions of the applications can be coupled via filters C1 and C2 in the hosts 894 and 896 respectively. These filters are analogous to computer C in FIGS. 5 to 10. The service provider can initiate a cut over of that user to the new application versions without needing to alter the applications or alert the user. The service provider is able to distribute a new connection policy to router A using a local connection policy manager 830 in or near the physical host 898. A new connection policy to achieve the cut over can also be fed to the filters B1, B2, C1 and C2 using other local connection policy managers 880, which are responsible for updating the tables of their local routers or filters or any other connection control nodes which control access to one or more endpoints. Of course it is important that during the cut over, router A can talk to either B1 and B2 or C1 and C2, but never be allowed to talk to C1 and either B1 or B2, and never allowed to talk to C2 and either B1 or B2. Otherwise the user may get conflicting responses or the applications may become inconsistent with each other or with the user for example.

As shown in FIG. 16, the process starts with the user using the service at step 700. At step 710, the service provider installs and configures the new versions of the applications. At step 720 the cut over is initiated by the service provider generating new connection policies adding allowable paths to the new versions and deleting allowable paths to the old versions. These are distributed as symbolic expressions of ranges of endpoint addresses to the local connection policy managers. At step 730, the local connection policy managers derive their local connection policies by partial instantiation of the connection policies using their own local ranges of endpoint addresses. Each router or filter controlled by each manager can then be configured at step 740 to route packets to and from the new versions of the applications. The new versions may need to communicate with the old versions to update the state of the new application to take over from the old application. This can be done under controlled conditions before or after the cut over, or using a shared disk for example, to avoid inconsistencies arising.

As shown by step 750, the routers and filters carry out dual authorisation checking of packets at ingress and egress to prevent the user communicating with e.g. old version of application B and the new version of application A simultaneously, or vice versa, during the cut over. This means the cut over can take place cleanly even if there is some delay between the five actions of router A cutting over, and filters B1 and B2 cutting off and C1 and C2 opening up to the router A. As these five actions take place at different physical hosts, in practice some relative delay is usually inevitable, particularly in a large network. Notably the use of local connection managers enables the calculation of the intersections of rules to be distributed. Particularly in large networks this can enable many waves of new changes to ripple through a network simultaneously without a need for a two way process of sending request for change to a central point and waiting for the response to come back before implementing it at the local node.

Figure 17:
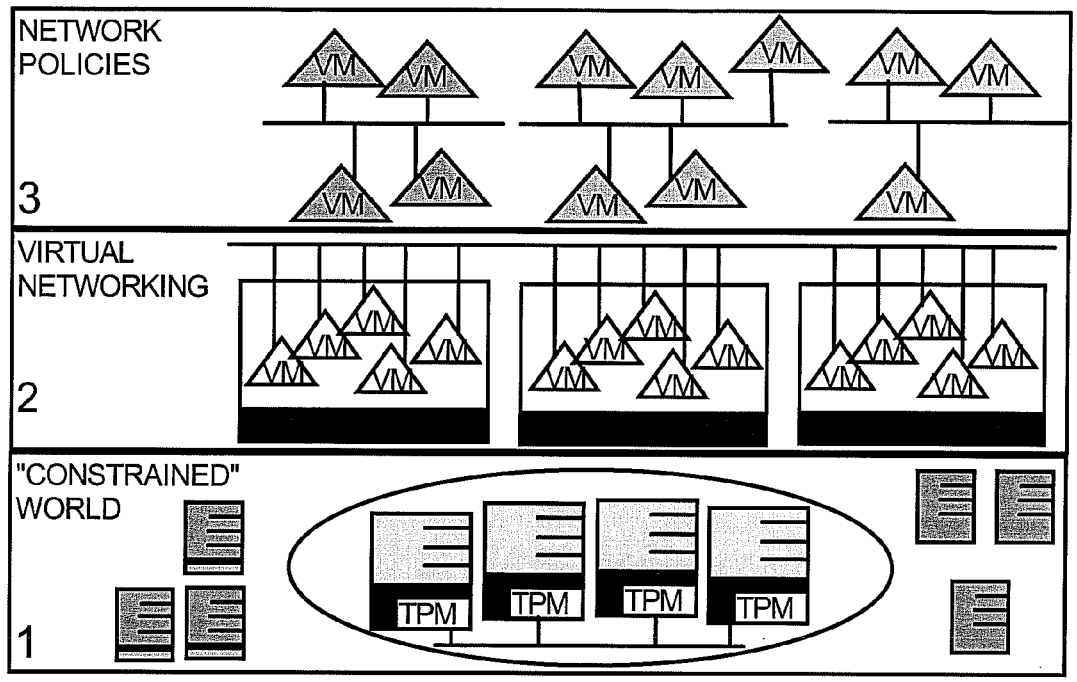
FIG. 17 shows schematically a three layer model of an embodiment having a virtual network of virtual machines.
Figure 18:
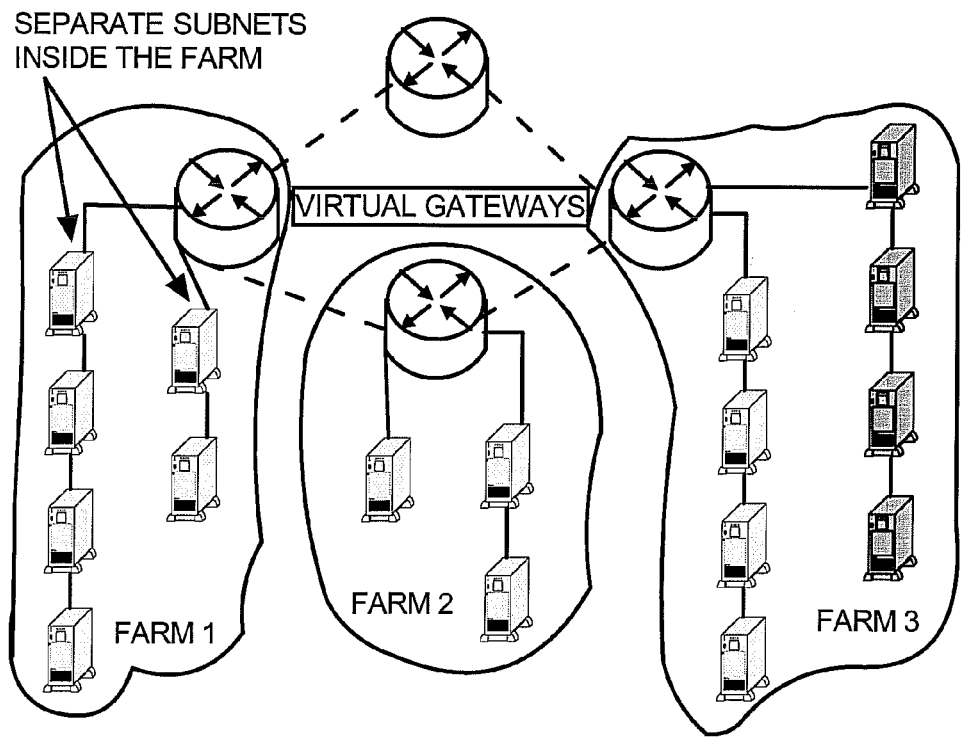
FIG. 18 shows an example of a topology of a segmented virtual network having several farms, each with one or more subnets, for use in some embodiments.
Figure 19:
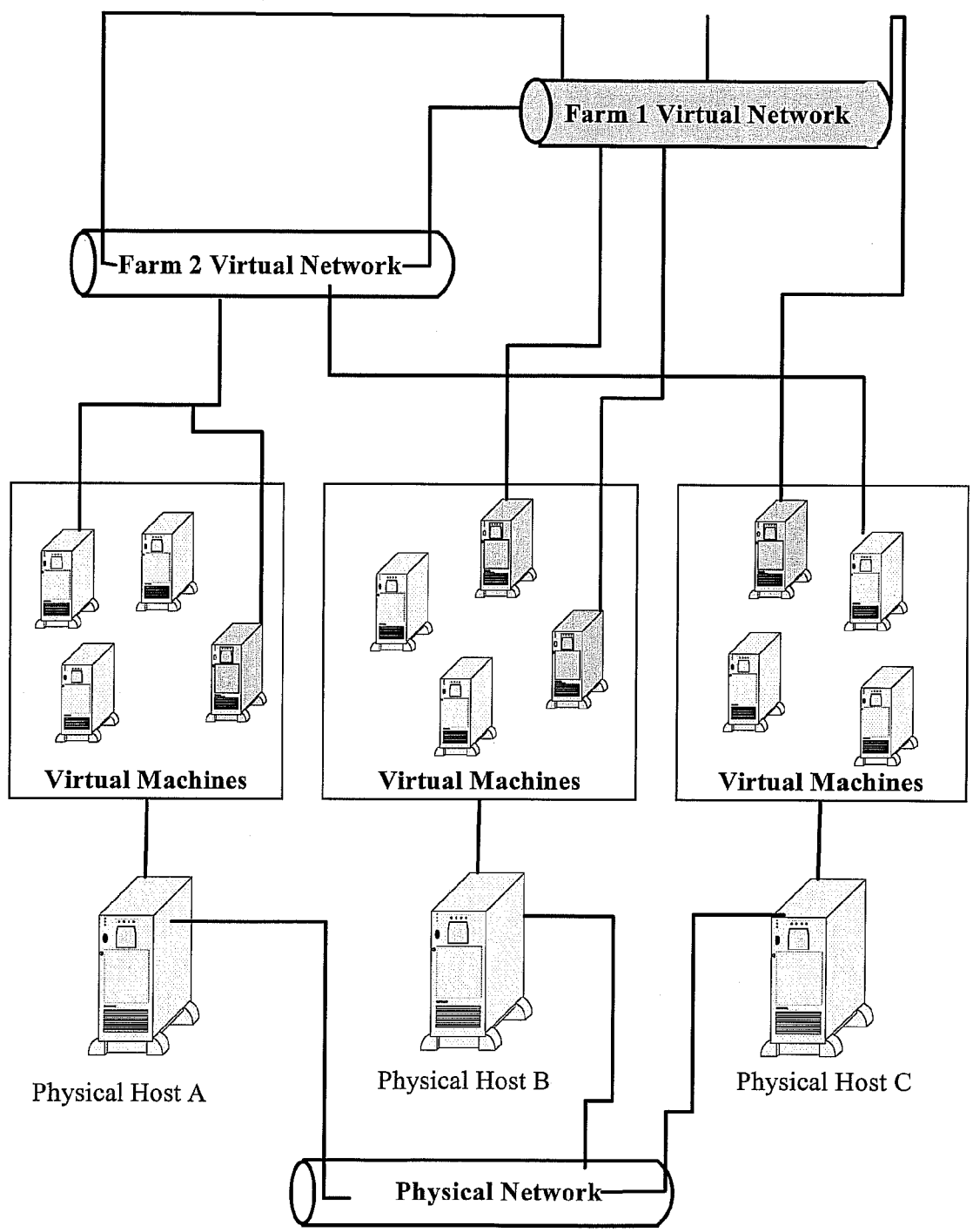

FIGS. 17 to 19

Virtual Network Implementations

The network can comprise a virtual network having virtual machines hosted by physical host machines coupled to form a physical network. In such virtual networks, new machines and new connection policies can be added or changed more rapidly, and numbers of nodes can be scaled more easily than with physical networks and so the advantages set out above apply more particularly to such virtual networks. Also, the physical network provides a convenient path invisible to customers for propagating connection policy.

FIG. 17 shows a schematic view having three layers. A bottom layer has a number of shared machines in the form of trusted platform modules TPM coupled by a physical network, which can be part of a data center. In a shared data center network there should be a feasible way of guaranteeing that only machines in a known, good state can access a secure, trusted network, and that no other machines can interfere with the system. On top of this, different (potentially competing) parties owning VMs within the virtualized infrastructure need dedicated, isolated virtual network resources while running over this shared, underlying physical network. The embodiments described can provide a way to validate network policies automatically to provide assurance about a system's global state from a networking point of view—which may be required to fulfil certain Service Level Agreements (SLAs).

The three layers illustrated can be summarised as a physical layer having a number of constraints, a virtual networking layer and a top layer of network policies. The first layer can have a physical network having a number of servers coupled together. The second layer shows a number of virtual machines hosted on each host, and coupled together on subnets to form a farm. The third level shows groups of virtual machines each isolated from other groups according to the policies. Some possible implementation examples On the physical network level the known 802.1X network access control standard can be used provided for example by Hewlett Packard ProCurve switches; additionally, known trusted computing technologies can be used to ensure that all physical machines are in a known good state. A single, trusted VLAN can be provisioned on all infrastructure switches. Access to this VLAN is only granted after a successful authentication using 802.1X. Machines that wish to be part of this trusted infrastructure are provisioned with a cryptographic key for the 802.1X authentication. However, this key is "sealed" to a specific, trusted platform configuration (the Trusted Computing Base or TCB) through a secure provisioning process and protected by a Trusted Platform Module (TPM) on that machine. Sealing ensures that the TPM will only release this secret (the network authentication key) if the platform is running a valid, attested TCB, and only then will the host be granted access to the secure VLAN. Through this mechanism a secure, "constrained world" network can be provided in which all machines can be trusted. As an alternative to the 802.1X solution, an approach in which communication between trusted machines is encrypted (or at least authenticated) can be provided and therefore protected from interference from untrusted machines that are hosted within the same physical infrastructure. In this scenario a gatekeeper component can be provided to which new nodes have to authenticate and prove that they run an attested TCB (again using Trusted Computing technologies) before they are provisioned with the network authentication key, so that they can participate in the secure communication.

On top of this trusted infrastructure secure network virtualization can be provided that is easy to manage and validate. Virtualisation based on layer 3 (network-level) information can provide the illusion of farms consisting of several subnets, such as the example shown in FIG. 18. For example the virtual IP address space is segmented by assigning IP addresses of the format 10.<FARM>.<SUBNET>.<HOST> to VMs. By default, VMs inside a subnet can communicate with each other without any restrictions, but communication between VMs of different subnets has to be explicitly allowed by the farm owner. Communication across two different farms is only permitted if both sides have mutually agreed on such a communication. At the core of the network is a notional gateway connecting all the subnets within a farm. The gateway mediates all inter-subnet communications within the farm and inter-farm communications across multiple farms. Its actual functionality can be contained in centralised form in a specific virtual machine, or in distributed form in routers amongst all the physical machines hosting VMs within the farm, as described in more detail in the above referenced co-pending application.

Where the underlying physical infrastructure is a fully switched network for example, distributed routers in VMMs can quickly discover the location of (virtual) IP addresses and pass packets directly to the destination machine without needing hops to virtual gateways. This can have a notable performance impact, especially for inter-farm communication. By operating on layer 3 network level information, the need for deploying and configuring routing entities (like routing VMs) can be avoided which is an important advantage in terms of manageability. Also, managing MAC addresses of many thousands of VMs is a significant burden for physical switches within virtualized infrastructures. By using address rewrite, no MAC addresses of VMs need appear on the physical wire, which provides the illusion of virtual gateways and limits broadcast and multicast traffic.

FIG. 18 shows an arrangement of a segmented virtual network which can be created using the VMMs of the embodiments described above for example. The virtual machines are grouped into farms, typically each farm can be for a different customer, or for different departments of a given organisation for example. Each farm is further divided into segments called subnets. Each subnet is coupled to other subnets in the same farm by a virtual gateway. Farms 1, 2 and 3 are shown, each having a virtual gateway with two subnets, though there can of course be many more subnets. Each virtual machine maintains the addresses of other virtual machines on its subnet, so that it can send messages to such other machines without restrictions or controls imposed by a virtual gateway. Optionally messages can be passed between farms by the virtual gateways. A fourth virtual gateway is shown not attached to a farm, which can be used for coupling to other destinations such as external networks.

The arrangement or topology of the virtual network can be completely independent of the topology of an underlying physical network. The topology of the subnets in an individual farm can be customer determined. The VMM or VMMs can provide a transparent virtual network layer which means that virtual machines do not need to know anything about the underlying physical network infrastructure (as for example that there is a single physical machine, or in another example, that there are many physical machines coupled by a completely switched physical network). Additionally, it is possible to configure VM-specific network policies on top of the virtual infrastructure, as will be explained below in more detail.

FIG. 19 shows an example of a number of virtual networks in the form of farms having a number of virtual machines hosted on a number of physical hosts, A, B and C in this case. As can be seen, farm 1 has virtual machines on hosts A, B and C, and farm 2 has virtual machines on hosts A and C. Of course other arrangements can be envisaged.

There can be a virtual network of virtual machines, hosted by a physical network of physical host machines hosting the virtual machines. Each of the physical host machines can have an operating system arranged to handle packets sent from one virtual machine to another in the virtual network. This operating system would conventionally be arranged to forward such packets to a virtual machine which functions as a centralised virtual router of the virtual network. This conventional virtual router could have a routing table having a mapping of which virtual machines are hosted by which of the physical machines. It would also pass packets on to another virtual router, if the virtual network were a segmented virtual network, with a virtual router at an interface between each segment. Each virtual router may alter an intermediate destination address of a packet, to correspond to the virtual address of the next virtual router, but leaves the final destination address of the destination virtual machine, unaltered.

An alternative is to have the routing function carried out by a virtual machine manager (VMM) which conventionally has only a bare switching function. The virtual machine manager can be arranged to host one or more virtual machines, the virtual machines forming part of a segmented virtual network, the virtual machine manager being arranged to receive outgoing messages from the virtual machines, at least a given one of the outgoing messages having a part allocated for an intermediate destination address of an intermediate node in a local segment of the segmented virtual network, the node being suitable for passing the given message on towards a destination node in another of the segments, the virtual machine manager having a router for determining a new intermediate destination address outside the local segment, and for routing the given outgoing message according to the new intermediate destination address.

By having the router as part of the virtual machine manager rather than having only a switch in the virtual machine manager the need for virtual gateways is avoided, and the steps involved in transferring the message to and from such virtual gateways can be avoided. This can reduce the number of "hops" for the message between virtual entities hosted. Hence messages can be processed more quickly or more messages can be processed, than if a virtual machine router were used.

The underlying physical network can be a completely switched network and in some cases can provide a "closed world" network. However, certain virtual machines may be allowed to communicate with external systems by means of a real NAT (network address translation) gateway that translates external IP addresses into data center allocated IP addresses which can be seen by the rest of the network as an "OUTSIDE" farm.

This makes use of having a fully virtualized infrastructure: network traffic to and from virtual machines from within the host OS is controlled. This approach can provide stronger security, and also allows enhanced overall network performance for a data center. Completely local traffic flow between virtual machines on one physical host is allowed, even if the VMs are on separate virtual subnets. Additionally, some specific virtual machines may be allowed to talk to the host OS directly. A transparent virtual network layer means that virtual machines need not know anything about the underlying physical network infrastructure (as for example that it can be a completely switched network). Additionally, it will be possible to configure VM-specific network policies on top of the virtual infrastructure.

Visibility rules that isolate traffic between farms that share the same physical network can be provided. These can be enforced as mandatory filtering rules that ALL network traffic has to pass, making it impossible for virtual machines to violate these policies. Communication between farms is only possible if both sides have agreed to allow cross-farm network traffic to pass. In the same manner network separation inside a farm, based on subnets can be enforced. These can be configured by the farm owner, but per default, virtual machines can only see each other if they reside on the same subnet. Communication between subnets appears to the VMs as if it is going through a gateway.

At the highest layer shown in FIG. 17, there is a distributed network policy management framework. A packet filtering component is embedded in all physical machines and enforces mandatory policies that cannot be bypassed by any VM. By allocating VM IP addresses using a meaningful abstraction (10.<F>.<S>.<H> or simply <F:S:H>) and constructing policies using global conventions (e.g., <0:0:*> is the management subnet or S=15 is the public subnet), compact, symbolic rules that define routing between farms and subnets can be expressed. These generic rules can be parameterized on the end-points when a VM is created and be translated into local packet filtering rules (using IPTables for example), as described with reference to FIGS. 11 to 16 for example.

When a new policy is added to the system, allowed routes can be calculated by a symbolic intersection of local policies which can be regarded as the overlap of "who wants to talk to me" and "to whom I want to talk to". These dual authorised paths are enforced for both inbound and outbound traffic. Through this it can be ensured that nodes with out-of-date policies do not introduce new transient routes that are not mutually agreed. Note that these checks can be done locally and therefore do not rely on a global control point—which makes this solution applicable in very large scale infrastructures. Each machine can be provisioned with a set of statically configured global rules that define the system as a whole from the network point of view. These can include 'negative meta-rules' which constrain future changes to the configuration, and all new rules have to be validated against these. It could be guaranteed that each system has been configured with these rules by including them in the attested TCB. Through provisioning and attesting the initial static configuration one can derive invariants that the system will always have—which is a major advantage in terms of proving that a system fulfils certain security requirements (such as those defined in SLAs).

FIG. 20

Symbolic Expression Example to Allow Supplier Access

FIG. 20 shows an example of some principal steps in another embodiment for altering connection policies to allow a supplier access to parts of a network of an enterprise. This example makes use of a network having a one-to-one mapping between network IP addresses and <farm:subnet:host> triplets. An enterprise wishes to allow access to their farm 3 by e.g. a supplier to monitor inventory on subnet 2, host 7, the supplier having machines on farm 8 subnet 5 as shown by step 760. The owner of farm 3 opens a virtual machine (VM) A with network address <3:2:7> allowing any VM in farm 8 to access it by adding at step 770 a local connection policy in the form of a rule:

connect($f1,s1,h1,f2,s2,h2$) where ($f1==3$) and ($s1==2$) and ($h1==7$) and ($f2==8$)

This implies that the local policy of any host that matches f1, s1, h1, will allow paths to any host that matches f2, s2, h2 (in other words it is a symbolic representation of a local connection policy for all nodes in the range of addresses f1, s1, h1 . . . ). The owner of farm 8 allows any VM in subnet 5 (in that farm) to talk to any VM in farm 3 by adding at step 780 a local connection policy having the rule:

connect($f1,s1,h1,f2,s2,h2$) where ($f1==8$) and ($s1==5$) and ($f2==3$)

A data centre network management system distributes these new local connection policies to all other local managers for connection control nodes at step 790. To compute the intersection at the local manager of the node, the program gathers both rules (assuming these are the only rules in the system) and at step 793 performs:

connect($f1,s1,h1,f2,s2,h2$) AND connect($f2,s2,h2,f1,s1,h1$)

which involves swapping the endpoint addresses for those rules from other nodes. If there are other pre existing rules, these should be combined in the "AND" expression. This expands to:

[(($f1==3$) and ($s1==2$) and ($h1==7$) and ($f2==8$)) or (($f1==8$) and ($s1==5$) and ($f2==3$))] and
[(($f2==3$) and ($s2==2$) and ($h2==7$) and ($f1==8$)) or (($f2==8$) and ($s2==5$) and ($f1==3$))]

and this simplifies to expression (1):

[($f1==8$) and ($s1==5$) and ($f2==3$) and ($s2==2$) and ($h2==7$)] or [($f1==3$) and ($s1==2$) and ($h1==7$) and ($f2==8$) and ($s2==5$)]

Now at step 795 each local manager instantiates expression (1) to compute the filter table for VM <3:2:7> by substituting f1 by 3, s1 by 2 and h1 by 7 in expression (1) to obtain:

[($f2==8$) and ($s2==5$)]

so ingress and egress filtering for VM <3:2:7> will be: <8:5:*> for allowable ingress source or egress destination values. These values may be used by the host of that VM to check any packets to or from that VM, and packets not meeting the criteria may be dropped.

Similarly, for a VM in farm 8 that can talk to the service, e.g., <8:5:9>, the manager substitutes f1 by 8, s1 by 5 and h1 by 9 in expression (1) to obtain:

[($f2==3$) and ($s2==2$) and ($h2==7$)]

so corresponding ingress and egress filtering for VM <8:5:9> will be: <3:2:7>

Note that it is also possible to validate that the local connection policy does not violate a meta rule defining any paths which must not be allowed. This can be implemented for example by running a check at the nodes that the rules respect the invariant never_connect by ensuring that:

connect($f1,s1,h1,f2,s2,h2$) and connect($f2,s2,h2,f1,s1,h1$) and never_connect($f1,s1,h1,f2,s2,h2$)=empty set This can be regarded as filtering the rules before the rules are used to configure the filter. Also, note that the constraints do not have to be of the form (x1==constant), other logical operators such as (<, <=, >, >=, == and !=) could be used. Simple terms comparing two variables e.g., (f1<f2) can be used.

Implementation:

The applications run by the data centers can include any type of software including CAD, database, web page server, and other types. The virtual machines can be implemented using any conventional programming language, including languages such as C, and compiled following established practice. The servers and network elements can be implemented using conventional hardware with conventional processors. The processing elements need not be identical, but should be able to communicate with each other, e.g. by exchange of messages.

Other variations can be conceived within the scope of the claims.

What is claimed is:

1. A non-transitory computer readable medium having stored thereon a computer program for implementing a connection policy in a distributed manner in a communications network having a plurality of connection control nodes having filtering, switching or routing functions, the connection policy comprising a local connection policy indicating which paths between a given one of the nodes and others of the nodes are allowable paths, and other local connection policies in respect of at least some of the other nodes, indicating their allowable paths, the computer program when executed being arranged to:

determine, for the given node, which of the allowable paths indicated as allowable by the local connection policy, are dual authorised, wherein an allowable path for the given node is dual authorised when the path is also being indicated as allowable by the other local connection policy relating to the other node at the other end of that path, and for a given message for a given path between two of the nodes having their own local connection policies, causing both of these nodes to determine whether the given path is currently dual authorised.

2. The non-transitory computer readable medium of claim 1, the connection policy comprising rules having a monotonic effect wherein each additional rule can only increase the number of allowable paths, and paths can only be removed by removing rules.

3. The non-transitory computer readable medium of claim 1, wherein the computer program is arranged to determine the dual authorised paths locally to the given node.

4. The non-transitory computer readable medium of claim 1, the local connection policy representing allowable paths by symbolic expressions of ranges of endpoint addresses.

5. The non-transitory computer readable medium of claim 4, the determination of the paths regarded as dual authorised paths by the given node comprising carrying out a boolean AND of the symbolic expressions for the local connection policy and for the other local connection policies to obtain an expression for the dual authorised paths as a function of node addresses.

6. The non-transitory computer readable medium of claim 5, wherein the computer program is arranged to check for dual authorised paths using a store of endpoint node addresses, determined by substituting node addresses local to the given node into the expression for the dual authorised paths.

7. The non-transitory computer readable medium of claim 1, the connection policy comprises a symbolic expression of ranges of endpoint addresses, and the program is also arranged to derive the local connection policy by partial evaluation of the symbolic expression using information associated with the given node.

8. The non-transitory computer readable medium of claim 1, wherein the computer program is arranged to validate that the local connection policy does not violate a meta rule defining any paths which must not be allowed.

9. The non-transitory computer readable medium of claim 1, the communications network being used for hosting multiple services, the computer program being arranged to cut over the multiple services to another version of the services at different addresses in the communications network by changing the connection policy so that a user of the services cannot be connected to old versions once connected to any of the new services.

10. The non-transitory computer readable medium of claim 1, wherein the computer program is arranged to allow bidirectional communication on an allowable path.

11. The non-transitory computer readable medium of claim 1, the communications network comprising a customer network implemented on shared infrastructure shared with other customers.

12. The non-transitory computer readable medium of claim 11, the connection policy being generated by the customer.

13. The non-transitory computer readable medium of claim 1, the communications network comprising a virtual network having virtual machines hosted by physical host machines coupled to form a physical network.

14. The non-transitory computer readable medium of claim 1, the connection control nodes comprising any one or more of: a filter with stored rules, a switch with a switching table, and a router with a routing table, and the computer program being arranged to update respectively the store of filter rules, or the switching table or the routing table, according to the determined dual authorised other nodes.

15. The non-transitory computer readable medium of claim 1, the communications network comprising an IP network and the connection policy being represented in the form of which selections of IP addresses are allowed to communicate with other selections of IP addresses.

16. A method of implementing a connection policy in a distributed manner in a communications network having a plurality of connection control nodes having filtering, switching or routing functions, the connection policy comprising a local connection policy indicating which paths between a given one of the nodes and others of the nodes are allowable paths, and other local connection policies in respect of at least some of the other nodes, indicating their allowable paths, the method having the steps of:
  determining by a device, for the given node, which of the allowable paths indicated as allowable by the local connection policy, are dual authorised, wherein an allowable path for the given node is dual authorised when the path is also being indicated as allowable by the other local connection policy relating to the other node at the other end of that path, and
  for a given message for a given path between two of the nodes having their own local connection policies, determining at both of these nodes whether the given path is currently dual authorised.

17. A data center having a number of physical host machines coupled by a network, the network having a plurality of connection control nodes having filtering, switching or routing functions, and local connection policy managers for arranging the connection control nodes to implement a connection policy in a distributed manner, the connection policy comprising a local connection policy indicating which paths between a given one of the nodes and others of the nodes are allowable paths, and other local connection policies in respect of at least some of the other nodes, indicating their allowable paths, the local connection policy managers being arranged to:
  determine, for the given node, which of the allowable paths indicated as allowable by the local connection policy, are dual authorised, wherein an allowable path for the given node is dual authorised when the path is also being indicated as allowable by the other local connection policy relating to the other node at the other end of that path, and
  arrange the connection control nodes such that for a given message for a given path between two of the nodes having their own local connection policies, both of these nodes determine whether the given path is currently dual authorised.

18. A method of providing a service from a data center, the data center having a number of physical host machines coupled by a network, the network having a plurality of connection control nodes having filtering, switching or routing functions, and local connection policy managers for arranging the connection control nodes to implement a connection policy in a distributed manner, the connection policy comprising a local connection policy indicating which paths between a given one of the nodes and others of the nodes are allowable paths, and other local connection policies in respect of at least some of the other nodes, indicating their allowable paths, the method having the steps of:
  providing an application on one of the physical host machines to provide the service, and making the application accessible to users of the service by setting the connection policy and causing the local connection policy managers to:
  determine by one of the plurality of connection control nodes, for the given node, which of the allowable paths indicated as allowable by the local connection policy, are dual authorised, wherein an allowable path for the given node is dual authorised when the path is also being indicated as allowable by the other local connection policy relating to the other node at the other end of that path, and
  arrange the connection control nodes such that for a given message for a given path between two of the nodes having their own local connection policies, both of these nodes determine whether the given path is currently dual authorised.

19. A method of using a service offered from a data center, the method having the steps of sending and receiving packets to and from the data center, and thereby causing the data center to implement a connection policy in a distributed manner, the data center having a communications network having a plurality of connection control nodes having filtering, switching or routing functions, the connection policy comprising a local connection policy indicating which paths between a given one of the nodes and others of the nodes are allowable paths, and other local connection policies in respect of at least some of the other nodes, indicating their allowable paths, the data center having determined, for the given node, which of the allowable paths indicated as allowable by the local connection policy, are dual authorised, wherein an allowable path for the given node is dual authorised when the path is also being indicated as allowable by the other local connection policy relating to the other node at the other end of that path, and the method having the steps of sending, by one of the plurality of connection control nodes, a message to the data center, the message following a given path between two of the nodes having their own local connection policies, causing both of these nodes to determine whether the given path is currently dual authorised, and receiving a message as part of the service from another path between two of the nodes having their own local connection policies, if both of these nodes have determined that this path is currently dual authorised.

\* \* \* \* \*